United States Patent
Ueki et al.

(10) Patent No.: US 9,583,769 B2
(45) Date of Patent: Feb. 28, 2017

(54) NON-AQUEOUS ELECTROLYTE SECONDARY BATTERY INCLUDING A POROUS LAYER HAVING FILLER PARTICLES AND METHOD OF MAKING THEREOF

(75) Inventors: Tomoyoshi Ueki, Toyota (JP); Harunari Shimamura, Moriguchi (JP); Yusuke Fukumoto, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 519 days.

(21) Appl. No.: 13/817,162

(22) PCT Filed: Aug. 19, 2010

(86) PCT No.: PCT/JP2010/064032
§ 371 (c)(1),
(2), (4) Date: Feb. 15, 2013

(87) PCT Pub. No.: WO2012/023199
PCT Pub. Date: Feb. 23, 2012

(65) Prior Publication Data
US 2013/0143091 A1    Jun. 6, 2013

(51) Int. Cl.
| | |
|---|---|
| *H01M 4/00* | (2006.01) |
| *H01M 4/62* | (2006.01) |
| *H01M 2/16* | (2006.01) |
| *H01M 4/13* | (2010.01) |
| *H01M 10/0566* | (2010.01) |
| *H01M 10/0587* | (2010.01) |

(52) U.S. Cl.
CPC ......... *H01M 4/626* (2013.01); *H01M 2/1646* (2013.01); *H01M 4/13* (2013.01); *H01M 10/0566* (2013.01); *H01M 10/0587* (2013.01); *Y02E 60/122* (2013.01)

(58) Field of Classification Search
CPC ...... H01M 4/626; H01M 4/13; H01M 2/1646; H01M 10/0566; H01M 10/0587; Y02E 60/122
See application file for complete search history.

(56) References Cited

U.S. PATENT DOCUMENTS

2009/0067119 A1    3/2009    Katayama et al.

FOREIGN PATENT DOCUMENTS

| JP | 2008-305783 | * 12/2008 | ............. H01M 2/16 |
|---|---|---|---|
| JP | 2012-014941 | 1/2012 | |

* cited by examiner

*Primary Examiner* — Raymond Alejandro
(74) *Attorney, Agent, or Firm* — Finnegan, Henderson, Farabow, Garrett & Dunner, LLP (57) ABSTRACT

A non-aqueous electrolyte secondary battery obtained by the present invention is a non-aqueous electrolyte secondary battery including an electrode body having a positive electrode sheet and a negative electrode sheet 20 stacked via a separator sheet 40. A porous layer 42 having filler particles 44 and a binder is formed between the separator sheet 40 and at least one of the positive electrode sheet and the negative electrode sheet 20. The median value in the circularity distribution of the filler particles 44 contained in the porous layer 42 is 0.85 to 0.97.

6 Claims, 6 Drawing Sheets

NON-AQUEOUS ELECTROLYTE SECONDARY BATTERY INCLUDING A POROUS LAYER HAVING FILLER PARTICLES AND METHOD OF MAKING THEREOF

CROSS-REFERENCE TO RELATED APPLICATIONS

This application is a national phase application of International Application No. PCT/JP2010/064032, filed Aug. 19, 2010, the content of which is incorporated herein by reference.

TECHNICAL FIELD

The present invention relates to a non-aqueous electrolyte secondary battery. More particularly, it relates to a non-aqueous electrolyte secondary battery in which a porous layer is formed between a separator sheet and at least one of a positive electrode sheet and a negative electrode sheet.

BACKGROUND ART

In recent years, a lithium ion battery, a nickel hydrogen battery, and other non-aqueous electrolyte secondary batteries have, been growing in importance as on-vehicle power sources, or power sources for personal computers and portable terminals. Particularly, the lithium ion battery which is light in weight, and capable of providing a high energy density is expected as the one to be preferably used as an on-vehicle high-output power source. With one typical configuration of this kind of lithium secondary battery, as a separator to be interposed between a positive electrode and a negative electrode, a polyolefin type porous film is used.

However, the polyolefin type porous film is made of a synthetic resin, and hence becomes more likely to be deformed when the temperature increases in the battery. This results in a higher risk of occurrence of the internal short circuit or the like. Therefore, as one of the means for surely preventing the occurrence of a defective condition such as the short circuit occurrence, a study has been conducted on, for example, the formation of a heat-resistant porous layer made of an inorganic filler on the surface of any of a positive electrode, a negative electrode, or a separator (e.g., Patent Literature 1). With this configuration, even when a deformation is caused in the separator, the heat-resistant porous layer can prevent the contact between the positive electrode and the negative electrode, which can inhibit the short circuit occurrence.

CITATION LIST

Patent Literature

Patent Literature 1: Japanese Patent Application Laid-open No. 2008-305783

In Patent Literature 1, there is disclosed a lithium secondary battery in which a second separator layer (porous layer) having a filler with a heat resistant temperature of 150° C. or more is formed on the surface of a first separator layer. The same publication indicates that the filler forming the heat resistant porous layer is preferably a plate-like particle. As the representative ones, plate-like alumina and plate-like boehmite are exemplified. However, when a heat resistant porous layer is formed using such plate-like particles, the porous layer is crushed under pressure due to swelling/shrinkage of the electrode accompanying charging/discharging. This results in the reduction of the porosity of the porous layer. When the porosity of the porous layer is reduced, the electrolyte and ions cannot pass through the inside of the porous layer. Accordingly, the performances (load characteristic and high rate durability) of the lithium secondary battery constructed using this become insufficient, thus leading to an undesirable result.

SUMMARY OF INVENTION

The present invention was made in view of such points. It is a main object thereof to provide a non-aqueous electrolyte secondary battery inhibited in performance deterioration due to the reduction of the porosity of the porous layer.

A non-aqueous electrolyte secondary battery provided by the present invention is a lithium secondary battery which includes an electrode body having a positive electrode sheet and a negative electrode sheet stacked via a separator sheet. A porous layer having filler particles and a binder is formed between the separator sheet and at least one of the positive electrode sheet and the negative electrode sheet. The median value in circularity distribution of the filler particles contained in the porous layer is 0.85 to 0.97.

The circularity of the filler particle can be determined from the following equation (1) by calculating the length of circumference and the area from the projected image of the filler particle (particle image).

$$\text{Circularity } a = L0/L1 \tag{1}$$

where L0 in the equation (1) represents the length of circumference of an ideal circle (perfect circle) having the same area as the area calculated from the projected image (particle image) of an actually measured objective particle, and L1 represents the actual length of circumference obtained by measuring the particle projected image (particle image) of the particle which is an object to be measured.

Namely, the circularity distribution (typically, the number distribution) of the powder serving as an object to be measured is determined by measuring the circularities calculated from the equation (1) for individual filler particles forming the powder. Such a circularity distribution can be measured with ease by means of, for example, a commercially available particle image analysis device such as a flow type particle image analysis device.

The median value in the circularity distribution of the filler particles obtained by the particle image analysis device is properly about 0.85 to 0.97. When the median value in the circularity distribution is larger than 0.97, the filler particle has a shape closer to a spherical shape. This results in an enhanced filling property of the filler particles, which makes it difficult to achieve a higher porosity of the porous layer. Further, the filler particles are highly filled, and become more likely to flow. Accordingly, the porous layer may be compressed under pressure of swelling/shrinkage accompanying charging/discharging, resulting in cycle deterioration. On the other hand, when the median value in the circularity distribution is smaller than 0.85, the porosity of the porous layer can be increased, but the amount of the filler included per volume of the porous layer is decreased. Accordingly, the action of preventing the contact between the positive electrode and the negative electrode may not be obtained. Further, the strength of the porous layer tends to be insufficient.

Accordingly, the porous layer may be crushed under pressure of swelling/shrinkage accompanying charging/discharging, resulting in cycle deterioration.

Therefore, the median value in the circularity distribution of the filler particles included in the porous layer is properly about 0.85 to 0.97, preferably 0.85 to 0.96, more preferably 0.85 to 0.93, and in particular preferably 0.85 to 0.9. Within such a circularity distribution range, it is possible to obtained a high electrolyte permeability and mechanical strength porous layer having a porosity preferable as the porous layer (e.g., 50 to 70%, preferably 56 to 70%, and in particular preferably 60 to 70%) while properly keeping the amount of the filler included per volume of the porous layer. When such a porous layer is used, it is possible to construct a non-aqueous electrolyte secondary battery having high safety, and favorable battery characteristics (load characteristic and high rate durability).

With one aspect of a preferable non-aqueous electrolyte secondary battery herein disclosed, in the circularity distribution of the filler particles included in the porous layer, a value of the circularity corresponding to cumulative 10% from the smaller circularity (which will be hereinafter referred to as a lower value) is 0.7 to 0.9. With such a circularity distribution, amorphous and angular particles are included in a given ratio. Accordingly, the angular particles inhibit slipping among the filler particles, which appropriately reduces the filling property of the filler. For this reason, it is possible to obtain an optimum porous layer which has achieved both of high mechanical strength and favorable electrolyte permeability as described above at a high level with stability.

In one aspect of a preferable non-aqueous electrolyte secondary battery herein disclosed, the filler particle is alumina or alumina hydrate. Alumina or alumina hydrate is preferable in that the adjustment of the circularity distribution is easy by processing such as grinding. Further, alumina or alumina hydrate is relatively higher in Mohs hardness, and hence is preferable in that it can improve the mechanical strength and the durability of the porous layer.

With one aspect of a preferable non-aqueous electrolyte secondary battery herein disclosed, the porous layer is formed on the surface of the separator sheet. In this case, the manufacturing cost becomes low, and a porous layer can be formed between the separator sheet and the electrode sheet without adversely affecting the battery performances. It is preferable that the porous layer is formed on a surface of the separator sheet opposite to the negative electrode sheet.

With one aspect of a preferable non-aqueous electrolyte secondary battery herein disclosed, the electrode body is a wound electrode body having the positive electrode sheet and the negative electrode sheet that are wound via the separator sheet. When the electrode body is a wound electrode body, the performance degradation caused by the reduction of the porosity of the porous layer particularly tends to occur. For this reason, it is particularly useful to apply the present invention thereto.

Any non-aqueous electrolyte secondary battery herein disclosed can have performances (e.g., capability of providing a high output) suitable as a battery to be mounted on a vehicle, and particularly, can be excellent in durability against high rate charging/discharging. Therefore, in accordance with the present invention, there is provided a vehicle having any non-aqueous electrolyte secondary battery herein disclosed. Particularly, there is provided a vehicle (e.g., a car) having the non-aqueous electrolyte secondary battery as a power source (typically, the power source of a hybrid vehicle or an electric vehicle).

DESCRIPTION OF EMBODIMENTS

Below, embodiments in accordance with the present invention will be described referring to the accompanying drawings. In the following drawings, members/parts exerting the same function are given the same reference numerals for description. Incidentally, the dimensional relationships (length, width, thickness, and the like) in each drawing do not reflect the actual dimensional relationships. Further, matters other than matters particularly mentioned in this description, and necessary for carrying out the present invention, (e.g., a configuration and a manufacturing method of an electrode body having a positive electrode and a negative electrode, configurations and manufacturing methods of a separator and an electrolyte, and general techniques in accordance with constructions of non-aqueous electrolyte secondary batteries and other batteries) can be understood as design matters of those skilled in the art based on related art technologies in the field.

Although not intended to be particularly limited, below, the present invention will be described in details by taking a non-aqueous electrolyte lithium secondary battery (lithium ion battery) in a form in which an electrode which has been wound (wound electrode body) and a non-aqueous electrolyte are accommodated in a cylindrical container as an example.

Figure 1:
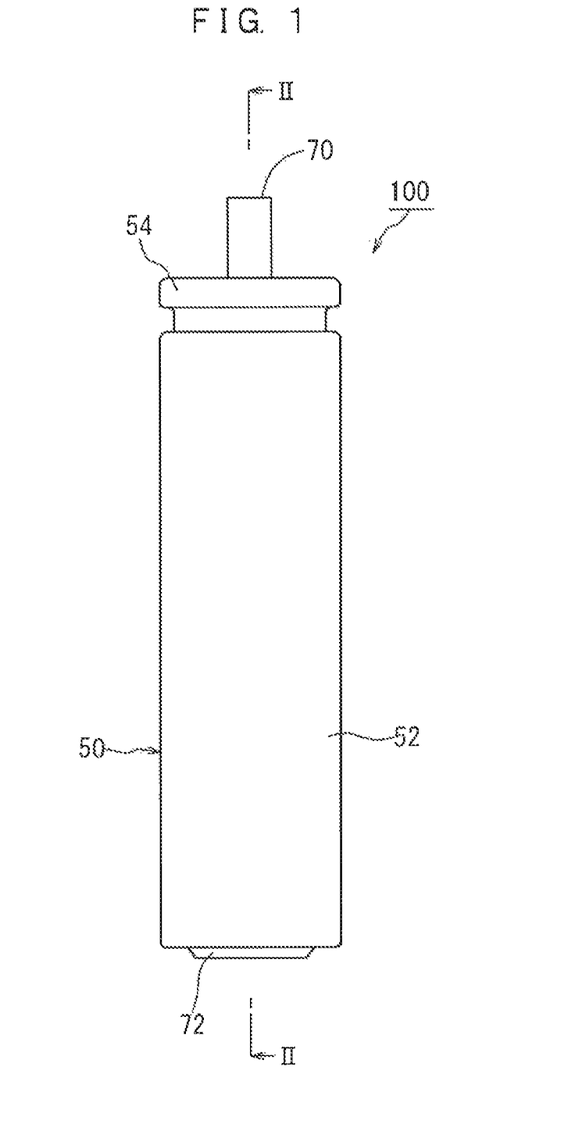
FIG. 1 is a side view schematically showing a non-aqueous electrolyte secondary battery in accordance with one embodiment of the present invention.
Figure 2:
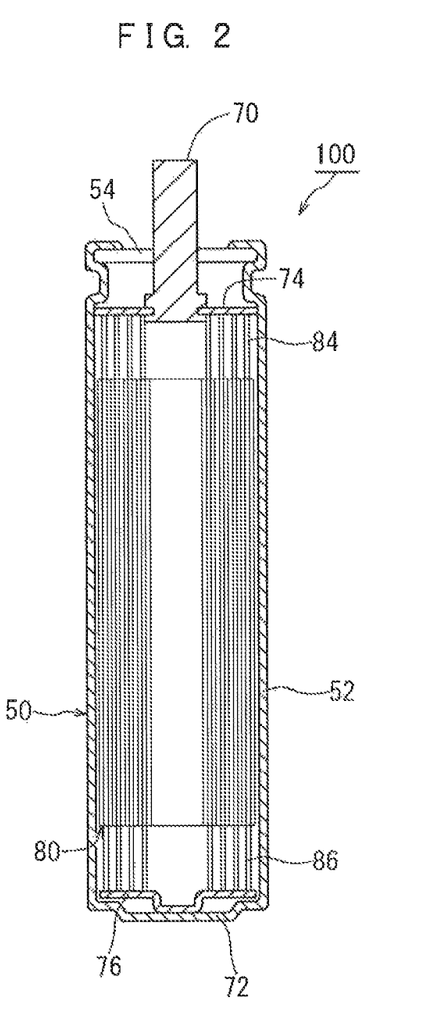
FIG. 2 is a cross-sectional view along line II-II of FIG. 1.
Figure 3:
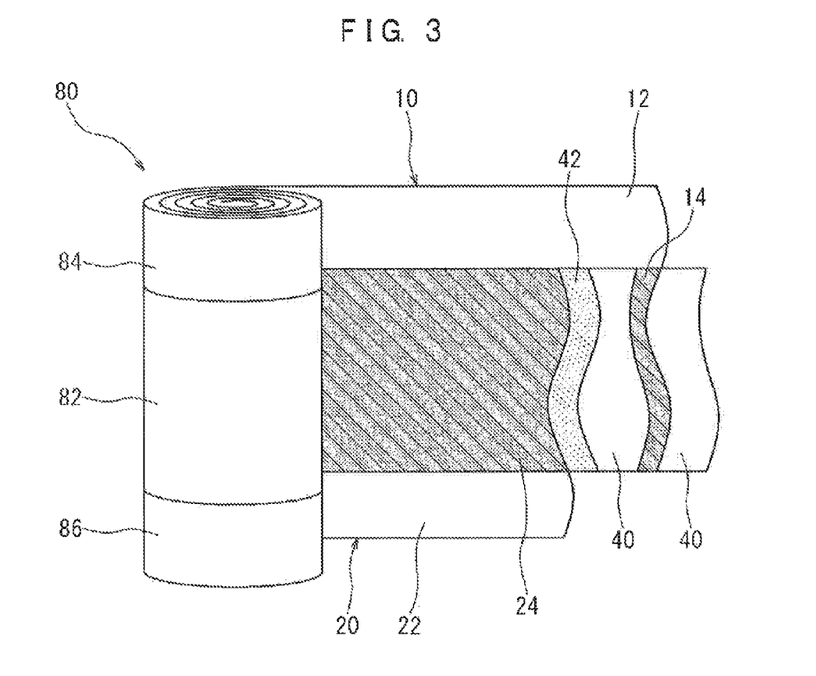
FIG. 3 is a view schematically showing an electrode body of the non-aqueous electrolyte secondary battery in accordance with one embodiment of the present invention.

The schematic configurations of a lithium ion battery in accordance with one embodiment of the present invention are shown in FIGS. 1 to 3. The lithium ion battery 100 has the following configuration: an electrode body (wound electrode body) 80 in a form in which a long-length positive electrode sheet 10 and a long-length negative electrode sheet 20 are wound via long-length separators 40 therebetween is accommodated together with a non-aqueous electrolyte not shown in a container 50 in a shape (cylindrical shape) capable of accommodating the wound electrode body 80.

The container 50 includes a bottomed cylindrical container main body 52 with the top end opened, and a lid body 54 for blocking the opening thereof. As the materials forming the container 50, there are preferably used metal materials such as aluminum, steel, and Ni-plated SUS (in the present embodiment, Ni-plated SUS). Alternatively, the container 50 obtained by forming a resin material such as PPS or polyimide resin is also acceptable. At the top surface of the container 50 (i.e., the lid body 54), there is disposed a positive electrode terminal 70 to be electrically connected with the positive electrode 10 of the wound electrode body 80. At the bottom surface of the container 50, there is disposed a negative electrode terminal 72 (in this embodiment, also serves as the container main body 52) to be electrically connected with the negative electrode 20 of the wound electrode body 80. In the inside of the container 50, the wound electrode body 80 is accommodated together with a non-aqueous electrolyte not shown.

The wound electrode body 80 in accordance with the present embodiment is equal to the wound electrode body of a general lithium ion battery except for the configuration of the separator 40 described later. As shown in FIG. 3, it has a long-length (band-like) sheet structure at the stage prior to assembly of the wound electrode body 80.

The positive electrode sheet 10 has a structure in which positive electrode active material layers 14 containing a positive electrode active material are held on both sides of a positive electrode collector 12 in a long-length sheet-shaped foil state. However, the positive electrode active material layer 14 is not deposited on one side edge (in the drawing, a bottom-side side edge portion) along the end side in the width direction of the positive electrode sheet 10. Accordingly, there is formed a positive electrode active material layer non-formation part at which the positive electrode collector 12 is exposed with a given width.

The negative electrode sheet 20 has, as with the positive electrode sheet 10, a structure in which negative electrode active material layers 24 containing an negative electrode active material are held on both sides of an negative electrode collector 22 in a long-length sheet-shaped foil state. However, the negative electrode active material layer 24 is not deposited on one side edge (in the drawing, a top-side side edge portion) along the end side in the width direction of the negative electrode sheet 20. Accordingly, there is formed a negative electrode active material layer non-formation part at which the negative electrode collector 22 is exposed with a given width.

For manufacturing the wound electrode body 80, as shown in FIG. 3, the positive electrode sheet 10 and the negative electrode sheet 20 are stacked via the separator sheets 40. At this step, the positive electrode sheet 10 and the negative electrode sheet 20 are stacked in relation slightly deviated from each other in the width direction so that the positive electrode active material layer non-formation part of the positive electrode sheet 10 and the negative electrode active material layer non-formation part of the negative electrode sheet 20 protrude from both sides in the width direction of the separator sheets 40, respectively. By winding the lamination body stacked in this manner, it is possible to manufacture the wound electrode body 80.

At the central portion in the direction of the winding shaft of the wound electrode body 80, a winding core portion 82 (i.e., the densely stacked portion of the positive electrode active material layer 14 of the positive electrode sheet 10, the negative electrode active material layer 24 of the negative electrode sheet 20, and the separator sheets 40) is formed. Whereas, at opposite ends in the direction of the winding shaft of the wound electrode body 80, the electrode active material layer non-formation parts of the positive electrode sheet 10 and the negative electrode sheet 20 protrude from the winding core portion 82 outwardly, respectively. To such a positive electrode side protruding portion (i.e., the non-formation part of the positive electrode active material layer 14) 84 and an negative electrode side protruding portion (i.e., the non-formation part of the negative electrode active material layer 24) 86, a positive electrode lead terminal 74 and an negative electrode lead terminal 76 are attached, respectively, and are electrically connected with the positive electrode terminal 70 and the negative electrode terminal 72 (herein, also serves as the container main body 52), respectively.

The components forming such a wound electrode body 80 may be the same as those of the wound electrode body of a conventional lithium ion battery except for the separator sheets 40, and have no particular restriction. For example, the positive electrode sheet 10 can be formed by applying the positive electrode active material layer 14 containing the positive electrode active material for a lithium ion battery as a main component on the long-length positive electrode collector 12. For the positive electrode collector 12, there is preferably used metal foil suitable for the positive electrode such as aluminum foil. As the positive electrode active materials, there can be used one, or two or more of the substances conventionally for use in a lithium on battery without particular restriction. As preferable objects to which the technology herein disclosed is applied, mention may be made of positive electrode active materials containing, as main components, oxides containing lithium and transition metal elements as constitutional metal elements (lithium transition metal oxide) such as lithium nickel oxide ($LiNiO_2$), lithium cobalt oxide ($LiCoO_2$), or lithium manganese oxide ($LiMn_2O_4$).

The negative electrode sheet 20 can be formed by applying the negative electrode active material layer 24 containing the negative electrode active material for a lithium ion battery as a main component on the long-length negative electrode collector 22. For the negative electrode collector 22, there is preferably used metal foil suitable for the negative electrode such as copper foil. As the negative electrode active materials, there can be used one, or two or more of the substances conventionally for use in a lithium ion battery without particular restriction. As preferable examples, mention may be made of carbon type materials such as graphite carbon and amorphous carbon, lithium-containing transition metal oxides, and transition metal nitrides.

The separator sheet 40 in accordance with the present embodiment has a large number of pores in the inside of the separator, and is configured such that a non-aqueous electrolyte and lithium ions can pass through the inside of the separator sheet through connection between the pores. Further, the separator sheet 40 is configured such that the pores are blocked (shut down) to interrupt the electrical contact between the positive and negative electrodes when the battery abnormally generates heat by overcharging or the like.

As the porous resins forming the separator sheet, for example, mention may be made of porous polyolefin type resins. As preferable examples, mention may be made of those of a monolayered structure of porous polyethylene (PE) and those of a three-layered structure of polypropylene (PP)/polyethylene (PE)/polypropylene (PP).

Further, a porous layer 42 is formed between the separator sheet 40 and at least one of the positive electrode sheet 10 and the negative electrode sheet 20. In this embodiment, the porous layer 42 is formed on the surface of the separator sheet 40 which is the surface opposite to the negative electrode sheet 20.

Figure 4:
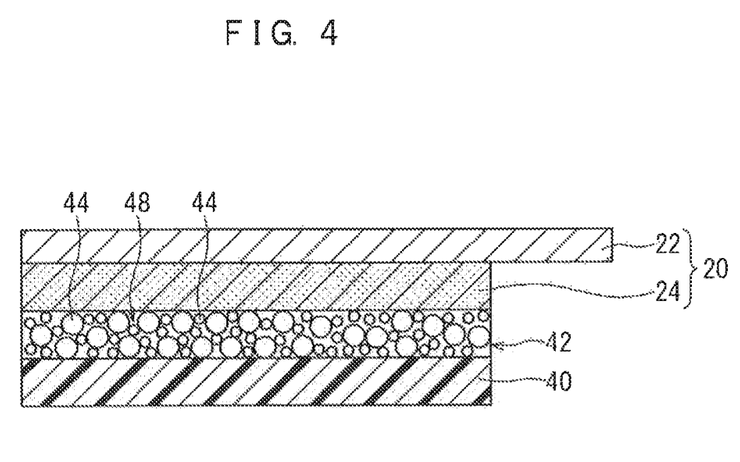
FIG. 4 is an enlarged cross-sectional view showing an essential part of the non-aqueous electrolyte secondary battery in accordance with one embodiment of the present invention.

Further, additionally referring to FIG. 4, the porous layer 42 in accordance with the present embodiment will be described in details. FIG. 4 is a schematic cross-sectional view showing a part of the cross section along the winding shaft of the wound electrode body 80 on an enlarged scale, and shows the separator sheet 40, the porous layer 42 formed on the surface of the separator sheet 40, and the negative electrode sheet 20 facing the porous layer 42.

The porous layer 42 in accordance with the present embodiment is, as shown in FIG. 4, formed of filler particles 44, and a binder not shown. The binder ensures a coupling between the filler particles, and between the filler particles and the separator sheet. The porous layer has a large of the pores 48 at sites not coupled by the binder, and is configured such that the non-aqueous electrolyte and ions can pass through the inside of the porous layer through connection between the pores 48. Further, the porous layer 42 has a heat resistance enough not to melt in a temperature region (e.g., 150° C. or more) higher than the melting point of the separator sheet 40. This results in that the porous layer 42 can avoid the electrical contact between the positive electrode and the negative electrode even when a deformation is caused in the separator sheet upon battery heat generation.

The porosity of the porous layer 42 is in general preferably set at 50% or more (e.g., 50 to 70%) providing good electrolyte and ion permeability, properly within the range of, for example, 52% or more (e.g., 52 to 70%), more preferably 56% or more (e.g., 56 to 70%), and in particular preferably 60% or more (e.g., 60 to 70%). With a porosity of the porous layer within such a range, the electrolyte and ion permeability is sufficient, which can improve the battery characteristics (load characteristic and cycle characteristic).

Whereas, for the membrane thickness, the membrane thickness can be appropriately selected according to the intended use. In order to surely obtain the action of preventing the contact between the positive electrode and the negative electrode, the membrane thickness is properly about 1 µm to 20 µm, preferably 2 to 10 µm, more preferably 3 to 6 µm, and in particular preferably 3 to 5 µm.

The filler particles forming the porous layer are preferably those having a heat resistance (e.g., 150° C. or more), and electrochemically stable within the battery service range. As such inorganic fillers, mention may be made of filler particles made of inorganometallic compounds. Preferable examples thereof may include inorganometallic compounds such as alumina ($Al_2O_3$), alumina hydrates (e.g., boehmite ($Al_2O_3 \cdot H_2O$)), magnesium hydroxide ($Mg(OH)_2$), and magnesium carbonate ($MgCO_3$). One, or two or more of the inorganometallic compound materials can be used. Out of these, alumina or alumina hydrate is preferable in that the adjustment of the circularity distribution is easy by processing such as grinding. The particle diameter of the filler particles such as D50 diameter according to the laser diffraction scattering method has no particular restriction. However, for example, when alumina is used, the particle diameter is preferably within about 0.2 µm to 1.2 µm. Whereas, when boehmite is used, the particle diameter is preferably within about 0.4 µm to 1.8 µm. Whereas, the specific surface area according to the BET method of the filler particles is preferably within the range of about 1.3 $m^2/g$ to 18 $m^2/g$, for example, when alumina is used. Whereas, when boehmite is used, the particle diameter is preferably within about 2.8 $m^2/g$ to 27 $m^2/g$.

Further, as the alumina hydrate providing the same effects other than boehmite, there can be exemplified pseudo boehmite, θ alumina (about 900° C.), δ alumina (about 800° C.), κ alumina (about 800° C.), γ alumina (about 500° C.), χ alumina (about 500° C.), η alumina (about 500° C.), pseudo γ alumina (about 500° C.), ρ alumina (about 250° C.), and the like. Incidentally, the numerical values in the parentheses represent preferable burning temperatures for synthesizing the alumina hydrates. Incidentally, typically, each $H_2O/Al_2O_3$ molar ratio of the alumina hydrates (which may be non-hydrate) can be 2:1 for pseudo boehmite, and within the range of 0 to 1 for other alumina hydrates.

As the shapes of the filler particles, there can be adopted various shapes of from those close to the plate shape to those close to the spherical shape. In the present embodiment, the median value in the circularity distribution of the filler particles is 0.85 to 0.97. When the median value in the circularity distribution is larger than 0.97, the filler particle has a shape closer to a spherical shape. This results in an enhanced filling property of the filler particles, which makes it difficult to achieve a higher porosity of the porous layer. Further, the filler particles are highly filled, and become more likely to flow. Accordingly, the porous layer may be compressed (rolled) under pressure of swelling/shrinkage accompanying charging/discharging, resulting in cycle deterioration. On the other hand, when the median value in the circularity distribution is smaller than 0.85, the porosity of the porous layer can be increased, but the amount of the filler included per volume of the porous layer is decreased. Accordingly, the action of preventing the contact between the positive electrode and the negative electrode may not be obtained. Further, the strength of the porous layer tends to be insufficient. Accordingly, the porous layer may be crushed under pressure of swelling/shrinkage accompanying charging/discharging, resulting in cycle deterioration.

Therefore, the median value in the circularity distribution of the filler particles included in the porous layer is properly about 0.85 to 0.97 (e.g., 0.9 to 0.97), preferably 0.85 to 0.96 (e.g., 0.91 to 0.96), more preferably 0.85 to 0.93, and in particular preferably 0.85 to 0.9. Within such a circularity distribution range, it is possible to obtain a high electrolyte permeability and mechanical strength porous layer having a porosity preferable as the porous layer (e.g., 50 to 70%, preferably 56 to 70%, and in particular preferably 60 to 70%) while properly keeping the amount of the filler included per volume of the porous layer. When such a porous layer is used, it is possible to construct a non-aqueous electrolyte lithium secondary battery having high safety, and favorable battery characteristics (load characteristic and high rate durability).

Further, in the circularity distribution of the filler particles included in the porous layer, the value of the circularity corresponding to cumulative 10% from the smaller circularity (which will be hereinafter referred to as a lower value) is preferably 0.7 to 0.9. When the lower value in the circularity distribution is larger than 0.9, most of the particles have a shape closer to the spherical shape. Accordingly, the particles are further more highly filled, resulting in a remarkable reduction of the porosity of the porous layer. In contrast, when the lower value in the circularity distribution is set at 0.7 to 0.9, amorphous and angular particles are included in a given ratio (about 10% of the total number). Accordingly, the angular particles inhibit slipping among the filler particles, which appropriately reduces the filling property of the filler. For this reason, it is possible to obtain an optimum porous layer which has achieved both of high mechanical strength and favorable electrolyte permeability as described above at a high level with stability.

Further, when the lower value in the circularity distribution is smaller than 0.7, the porosity of the porous layer is still more increased, but the amount of the filler included per volume of the porous layer is decreased. Accordingly, the action of preventing the contact between the positive electrode and the negative electrode may not be obtained. Therefore, the lower value in the circularity distribution is properly about 0.7 to 0.9, preferably 073 to 0.88, more preferably 035 to 0.85, and in particular preferably 0.78 to 0.82. Within this range, it is possible to obtain an optimum porous layer which has achieved both of high mechanical strength and favorable ion permeability while properly keeping the amount of the filler included per volume of the porous layer.

The binder for use in the porous layer is the one for ensuring a binding between the filler particles. The materials forming the binder themselves have no particular restriction, and various ones can be widely used. Preferable examples thereof may include acrylic resins. As acrylic resins, there are preferably used homopolymers obtained by polymerizing monomers such as acrylic acid, methacrylic acid, acrylamide, methacrylamide, 2-hydroxyethyl acrylate, 2-hydroxyethyl methacrylate, methacrylate, methyl methacrylate, ethylhexyl acrylate, and butyl acrylate, alone. Alternatively, acrylic resins may be copolymers obtained by polymerizing two or more of the monomers. Further, acrylic resins may be a mixture of two or more of the homopolymers and copolymers. Other than the acrylic resins, there can also be used polyvinylidene fluoride, polytetrafluoroethylene (PTFE), polyacrylonitrile, methyl polymethacrylate, and the like.

Incidentally, although not particularly restricted, the proportion of the filler particles based on the total amount of the porous layer is preferably about 90 mass % or more (typically, 95 mass % to 99 mass %), and preferably about 96 mass % to 99 mass %. Whereas, the proportion of the hinder in the porous layer is preferably set at about 5 mass % or less, and preferably set at about 4.9 mass % or less (e.g., about 0.5 mass % to 3 mass %). Further, when other porous layer forming components (e.g., thickener) than the filler particles and the binder are contained, the total content ratio of the given components is preferably set at about 3 mass % or less, and preferably set at about 2 mass % or less (e.g., about 0.5 mass % to 1 mass %).

Subsequently, the method for forming the porous layer will be described. The porous layer formation method includes:

(A) preparing a metal compound powder as filler particles (a commercially available metal compound powder may be purchased, or synthesis thereof may be voluntarily performed);

(B) subjecting the metal compound powder to a grinding treatment or a spheroidization treatment so that the median value in the circularity distribution of the prepared metal compound powder becomes 0.85 to 0.97; and (C) after the grinding treatment or the spheroidization treatment, preparing a porous layer forming paint in which the metal compound powder and the binder are dispersed in a solvent, and applying this on at least any one surface of a positive electrode sheet, a negative electrode sheet, and a separator sheet, and drying the paint, and thereby forming a porous layer.

In the step of preparing a metal compound powder in the (A), there is prepared a metal compound powder for use in the porous layer. The metal compound powder results from synthesis of a prescribed raw material compound powder. For example, there is prepared a powder of a raw material compound (i.e., starting raw material) containing a part of the metal elements forming the metal compound powder. The raw material compound is burned. As a result, synthesis can be achieved. Alternatively, a powder of a raw material compound (i.e., starting raw material) containing a part of the metal elements forming the metal compound powder is dissolved or dispersed in a proper solvent, and is held in a thermostat. The resulting reaction product is filtrated, washed, and dried. As a result, synthesis can be achieved. Alternatively, a commercially available metal compound powder (manufactured product) may be purchased, and used.

For example, when an alumina powder is synthesized, there is prepared a power of a raw material compound (e.g., aluminum hydroxide) containing a metal element (Al) forming the alumina powder. The raw material compound powder may desirably be burned in the air or in an oxygen gas atmosphere more rich in oxygen than the air. The resulting burned product is ground to a proper size (particle diameter), resulting in a desired alumina powder. The burning temperature in the burning treatment may be desirably within a temperature range in which the reaction for changing the raw material compound into alumina proceeds. Generally, burning is preferably performed at 1000° C. or more (e.g., 1000 to 1200° C., e.g., 1150° C.±50° C.). Whereas, the burning time may be desirably set at the time until the reaction for changing the raw material compound into alumina sufficiently proceeds. Generally, 90 hours or more (e.g., 90 to 120 hours, e.g., about 96 hours) is enough. Burning under such conditions allows alumina particles to grow large. For this reason, a grinding treatment or a spheroidization treatment described later facilitates the adjustment of the circularity distribution of the alumina powder.

Whereas, the boehmite powder can be synthesized by a hydrothermal method. For example, desirably, there is prepared a powder of a raw material compound (e.g., alumina trihydrate) containing a metal element (Al) forming the boehmite powder. The raw material compound powder, calcium hydroxide, and water are charged in a pressure vessel, and is held in a thermostat. The resulting reaction product is filtrated, washed, and dried, resulting in a desired boehmite powder. The retention temperature in the thermostat may be desirably within a temperature range for forming a reaction product, and generally, is preferably held at 180° C. or more (e.g., 180 to 220° C., e.g., 200° C.±10° C.). Further, the retention time may be desirably set at the time until the reaction product is sufficiently formed. Generally, 60 hours or more (e.g., 60 to 100 hours, e.g., about 72 hours) is enough. Addition of calcium hydroxide allows boehmite particles to grow large. For this reason, a grinding treatment or a spheroidization treatment described later facilitates the adjustment of the circularity distribution of the boehmite powder.

In the step of performing a grinding treatment or a spheroidization treatment in the (B), the metal compound powder is subjected to a grinding treatment or a spheroidization treatment so that the median value in the circularity distribution of the resulting metal compound powder becomes 0.85 to 0.97.

When the median value in the circularity distribution of the resulting metal compound powder is larger than 0.97, the metal compound powder may be desirably subjected to a grinding treatment so that the median value in the circularity distribution becomes 0.85 to 0.97.

The grinding device for use such a grinding treatment has no particular restriction so long as it can properly adjust the median value in the circularity distribution within the range of 0.85 to 0.97. For example, grinding devices such as jet mill, ball mill, and vibration mill can be preferably used. Out of these, a jet mill is preferably used in that it can more properly adjust the circularity distribution.

When the grinding treatment is performed using the jet mill, the circularity distribution of the metal compound powder can be adjusted by changing the grinding conditions such as air pressure (grinding gas pressure) and grinding time. Namely, by properly selecting the grinding conditions such as air pressure (grinding gas pressure) and grinding time, it is possible to form a metal compound powder having a median value in the circularity distribution satisfying 0.85 to 0.97. For example, the air pressure (grinding gas pressure) of the jet mill is preferably set at about 0.2 to 0.4 MPa. Whereas, the degree of the circularity distribution also depends upon the time spent for the grinding treatment. The grinding time is preferably set at about 5 to 20 minutes. By performing grinding with an impact force due to the air pressure and grinding time in such prescribed ranges, it is possible to readily form a metal compound powder having a median value in the circularity distribution satisfying 0.85 to 0.97. Incidentally, which condition is changed for adjusting the circularity distribution of the metal compound powder may be appropriately determined according to the grinding device to be used.

When the median value in the circularity distribution of the resulting metal compound powder is smaller than 0.85, the metal compound powder may be desirably subjected to a spheroidization treatment so that the median value in the circularity distribution becomes 0.85 to 0.97. The treatment device for use in the spheroidization treatment has no particular restriction so long as it can properly adjust the median value in the circularity distribution within the range of 0.85 to 0.97. There can be preferably used particle treatment devices such as KRYPTRON Orb (manufactured by Earthtechnica Co., Ltd.,) or FACULTY (manufactured by Hosokawa Micron Corporation). Out of these, use of KRYPTRON Orb is preferable in that it can perform a spheroidization treatment without changing the particle diameter of the filler particles.

When a spheroidization treatment is performed using the KRYPTRON Orb, the circularity distribution of the metal compound powder can be adjusted by changing the treatment conditions such as the number of revolutions and the number of treatment cycles. Namely, by properly selecting the treatment conditions such as the number of revolutions and the number of treatment cycles, it is possible to form a metal compound powder having a median value of the circularity distribution satisfying 0.85 to 0.97. For example, the number of revolutions of the KRYPTRON Orb is preferably set at about 6000 to 10000 rpm. Whereas, the degree of the circularity distribution also depends upon the number of treatment cycles each performing the spheroidization treatment. The number of treatment cycles is preferably set at about 2 to 5. By performing a spheroidization treatment under such conditions, it is possible to readily form a metal compound powder having a median value in the circularity distribution satisfying 0.85 to 0.97. Incidentally, which condition is changed for adjusting the circularity distribution of the metal compound powder may be appropriately determined according to the treatment device to be used. The spheroidization treatment can also be performed using a jet mill. The jet mill can also be controlled in air flow rate, thereby to round the sharp edges of the particles, which can enhance the circularity.

In the step of forming a porous layer in the (C), the median value in the circularity distribution of the metal compound powder is adjusted within the range of 0.85 to 0.97 by the grinding treatment or the spheroidization treatment. Then, the metal compound powder and the binder are dispersed in a solvent. Thus, a porous layer forming paint is prepared. Then, the porous layer forming paint is coated on the surface of the separator sheet, and is dried, thereby to form a porous layer.

As the solvents for use in the porous layer forming paint, mention may be made of organic type solvents such as N-methylpyrrolidone (NMP), pyrrolidone, methyl ethyl ketone, methyl isobutyl ketone, cyclohexanone, toluene, dimethylformamide, and dimethylacetamide, or combinations of two or more thereof. Alternatively, water or a mixed solvent containing water as a main component is also acceptable. As other solvents than water, forming such a mixed solvent, one, or two or more of organic solvents (such as lower alcohols and lower ketones) which can be uniformly mixed with water can be appropriately selected to be used. The content of the solvent in the porous layer forming paint has no particular restriction, but is preferably about 30 to 60 mass % based on the total amount of the paint.

Incidentally, the porous layer forming paint can contain, other than the metal compound powder (filler particles) and the binder, one, or two or more materials which can be used, if required. Examples of such materials may include polymers functioning as a thickener of the porous layer forming paint. As the polymer functioning as a thickener, for example, carboxylmethyl cellulose (CMC) is preferably used.

The operation of coating such a porous layer forming paint on the separator sheet surface can be performed in the same manner as with the case where the porous layer included in a conventional general lithium secondary battery is manufactured. For example, using a proper coating device (such as gravure coater, slit coater, die coater, comma coater, or dip coater), the porous layer forming paint is coated in a prescribed amount with a uniform thickness on the separator, thereby achieving manufacturing thereof.

Thereafter, by a proper drying means, the coated material is dried (dried at, typically, a lower temperature than the melting point of the separator sheet, e.g., 110° C. or less, e.g., 30 to 80° C.), thereby to remove the solvent in the porous layer forming paint. By removing the solvent from the porous layer forming paint, it is possible to form a porous layer including a metal compound powder and a binder. In this manner, the porous layer can be formed on the surface of the separator sheet.

The resulting porous layer is formed using a metal compound powder (filler particles) having a median value in the circularity distribution satisfying 0.85 to 0.97. For this reason, it is possible to obtain an optimum porous layer which has achieved both of high mechanical strength and favorable ion permeability while properly keeping the amount of the filler per volume of the porous layer. When such a porous layer is used, it is possible to construct a lithium secondary battery satisfying at least one (preferably, all) of being high in high rate cycle durability, being good in charging/discharging characteristics, and being excellent in safety.

Incidentally, a lithium secondary battery can be constructed by adopting the same materials and processes as in related art, except for using the porous layer herein disclosed.

For example, desirably, the porous layer 42 is formed on the surface of the separator sheet 40 in the foregoing manner: then, as shown in FIG. 3, the positive electrode sheet 10 and the negative electrode sheet 20 are wound via two separator sheets 40 therebetween, thereby to manufacture a wound electrode body 80. Then, desirably, as shown in FIG. 2, the wound electrode body 80 is accommodated in the container main body 52, and an appropriate non-aqueous electrolyte is disposed (injected) in the container main body 52.

As the non-aqueous electrolyte to be accommodated together with the wound electrode body 80 in the container main body 52, the same ones as the non-aqueous electrolytes for use in conventional lithium ion batteries can be used without particular restriction. Such a non-aqueous electrolyte typically has a composition in which an appropriate solvent contains a supporting salt. As the non-aqueous solvents, there can be used, for example, ethylene carbonate (EC), ethyl methyl carbonate (EMC), dimethyl carbonate (DMC), diethyl carbonate (DEC), and propylene carbonate (PC). Whereas, as the supporting salts, there can be preferably used lithium salts such as, for example, $LiPF_6$, $LiBF_4$, $LiAsF_6$, $LiCF_3SO_3$, and $LiClO_4$. For example, there can be preferably used a non-aqueous electrolyte prepared by allowing a mixed solvent including EC, EMC, and DMC in a volume ratio of 3:4:3 to contain $LiPF_6$ as a supporting salt in a concentration of about 1 mol/liter.

The non-aqueous electrolyte is accommodated together with the wound electrode body 80 in the container main body 52. Then, the opening of the container main body 52 is sealed by the lid body 54. As a result, the construction (assembly) of the lithium ion battery 100 in accordance with the present embodiment is completed. Incidentally, the sealing process of the container main body 52 and the disposition (injection) process of the electrolyte can be performed in the same manner as with the method performed for manufacturing of a conventional lithium ion battery. Then, conditioning (initial charging/discharging) of the battery is performed. If required, the steps of degassing, quality inspection, and the like may be performed.

Below, test examples regarding the present invention will be described. However, it is not intended that the present invention is limited to the following test examples.

<Manufacturing of Filler Particles>

In Example 1, as filler particles, a boehmite powder was manufactured. First, 100 g of alumina trihydrate and 150 g of water which were starting raw materials were charged into a pressure container, to which 17 mg of calcium hydroxide was added. Then, the mixture was held at a 200° C. thermostat for 72 hours. The resulting reaction product was filtrated, washed, and dried, thereby to synthesize boehmite. Then, the resulting boehmite synthesized product was charged into a jet mill (manufactured by Hosokawa Micron Corporation: model 100AFG), and ground at an air pressure of 0.3 MPa for 15 minutes. As a result, a boehmite powder was manufactured. The resulting boehmite powder had a median value of 0.85 and a lower value of 0.7, in the circularity distribution. Incidentally, the median value and the lower value in the circularity distribution were calculated using a flow type particle image analysis device (manufactured by Sysmex Corporation: model FPIA-3000: the number of photographed particles was set at 2000).

In Example 2, a commercially available titania powder (manufactured by Kanto Chemical Co., Inc.) was charged into a jet mill, and was ground under the conditions shown in Table 1, thereby to manufacture a titania powder. The resulting titania powder had a median value of 0.89 and a lower value of 0.73, in the circularity distribution. Incidentally, the median value in the circularity distribution of the titania powder before grinding was about 0.985.

In Examples 3 to 6, as filler particles, an alumina powder was manufactured. First, aluminum hydroxide which was a starting raw material was burned in an air atmosphere at 1050° C. for 96 hours, thereby to synthesize α alumina. Then, the resulting alumina synthesized product was charged into a jet mill, and was ground under the conditions shown in Table 1, thereby manufacturing an alumina powder. In the order of Examples 3 to 6, the median values of the circularity distribution of the resulting alumina powder were 0.91, 0.93, 0.95, and 0.96, respectively, and the lower values thereof were 0.82, 0.85, 0.88, and 0.89, respectively.

In Example 7, a commercially available magnesium hydroxide powder (manufactured by Kanto Chemical Co., Inc.) was charged into a jet mill, and was ground under the conditions shown in Table 1, thereby to manufacture a magnesium hydroxide powder. The resulting magnesium hydroxide powder had a median value of 0.965 and a lower value of 0.9, in the circularity distribution. Incidentally, the median value in the circularity distribution of the magnesium hydroxide powder before grinding was about 0.84.

In Example 8, a commercially available magnesium carbonate powder (manufactured by Kanto Chemical Co., Inc.) was charged into a jet mill, and was ground under the conditions shown in Table 1, thereby to manufacture a magnesium carbonate powder. The resulting magnesium carbonate powder had a median value of 0.97 and a lower value of 0.91, in the circularity distribution. Incidentally, the median value in the circularity distribution of the magnesium carbonate powder before grinding was about 0.98.

In Comparative Example 1, a titania powder was manufactured in the same manner as in Example 2, except for changing grinding by the jet mill into that under the conditions shown in Table 1. The resulting titania powder had a median value of 0.8 and a lower value of 0.68, in the circularity distribution.

In Comparative Example 2, an alumina powder was manufactured in the same manner as in Examples 3 to 6, except for changing grinding by the jet mill into that under the conditions shown in Table 1. The resulting alumina powder had a median value of 0.82 and a lower value of 0.66, in the circularity distribution.

In Comparative Example 3, a commercially available titania powder (manufactured by Kanto Chemical Co., Inc.) was charged into a KRYPTRON Orb (manufactured by Earthtechnica Co., Ltd.: model CSH0), and treated at a number of revolutions of 8000 rpm three times, thereby manufacturing a titania powder. The resulting titania powder had a median value of 0.98 and a lower value of 0.92, in the circularity distribution.

In Comparative Example 4, a commercially available alumina powder (manufactured by Kanto Chemical Co., Inc.) was charged into a KRYPTRON Orb, and was treated under the conditions shown in Table 1, thereby manufacturing an alumina powder. The resulting alumina powder had a median value of 0.983 and a lower value of 0.92, in the circularity distribution.

TABLE 1

|  | Kind of filler | Treatment device | Number of revolutions of treatment device/ rpm | Air pressure of treatment device/ MPa | Treatment time/number of cycles | Circularity of filler (median value) | Circularity of filler (lower value) |
|---|---|---|---|---|---|---|---|
| Ex. 1 | Boehmite | Jet mill | — | 0.3 | 15 minutes | 0.85 | 0.7 |
| Ex. 2 | Titania | Jet mill | — | 0.3 | 15 minutes | 0.89 | 0.73 |
| Ex. 3 | α alumina | Jet mill | — | 0.4 | 18 minutes | 0.91 | 0.82 |

TABLE 1-continued

| | | | | | | | |
|---|---|---|---|---|---|---|---|
| Ex. 4 | α alumina | Jet mill | — | 0.4 | 14 minutes | 0.93 | 0.85 |
| Ex. 5 | α alumina | Jet mill | — | 0.3 | 10 minutes | 0.95 | 0.88 |
| Ex. 6 | α alumina | Jet mill | — | 0.2 | 8 minutes | 0.96 | 0.89 |
| Ex. 7 | Magnesium hydroxide | Jet mill | — | 0.2 | 7 minutes | 0.965 | 0.9 |
| Ex. 8 | Magnesium carbonate | Jet mill | — | 0.2 | 7 minutes | 0.97 | 0.91 |
| Comp. Ex. 1 | Titania | Jet mill | — | 0.4 | 20 minutes | 0.8 | 0.68 |
| Comp. Ex. 2 | α alumina | Jet mill | — | 0.4 | 40 minutes | 0.82 | 0.66 |
| Comp. Ex. 3 | Titania | KRYPTRON Orb | 8000 | — | 3 times | 0.98 | 0.92 |
| Comp. Ex. 4 | α alumina | KRYPTRON Orb | 9000 | — | 4 times | 0.983 | 0.92 |

| | Porosity of porous layer/% | Thickness of porous layer/μm | Kind of separator | Membrane resistance/Ω | Resistance increase ratio/% | Internal short circuit test |
|---|---|---|---|---|---|---|
| Ex. 1 | 70 | 3.5 | PP/PE/PP | 1.33 | 4.5 | Good |
| Ex. 2 | 66 | 3.7 | PE | 1.36 | 5.1 | Good |
| Ex. 3 | 60 | 4 | PP/PE/PP | 1.5 | 6 | Good |
| Ex. 4 | 58 | 4.1 | P/PE/PP | 1.6 | 8 | Good |
| Ex. 5 | 56 | 4.2 | PE | 1.65 | 10.5 | Good |
| Ex. 6 | 53 | 4.2 | PP/PE/PP | 1.67 | 11.2 | Good |
| Ex. 7 | 52 | 4.3 | PP/PE/PP | 1.68 | 12 | Good |
| Ex. 8 | 51 | 4.4 | PE | 1.7 | 13 | Good |
| Comp. Ex. 1 | 72 | 5.1 | PE | 1.31 | 470 | No Good |
| Comp. Ex. 2 | 71 | 4.3 | PP/PE/PP | 1.32 | 490 | No Good |
| Comp. Ex. 3 | 41 | 5 | PP/PE/PP | 2.1 | 250 | Good |
| Comp. Ex. 4 | 39 | 4.2 | PP/PE/PP | 2.3 | 300 | Good |

<Formation of Porous Layer>

Each of the resulting various metal compound powders (filler particles) and an acrylic binder were mixed in NMP so that the mass ratio of the metal compound powder and the binder becomes 97.4:2.6, and so that the solid content becomes 40 mass %, thereby preparing a porous layer forming paint. This was coated onto one side of the long-length separator sheet 40, and was dried, thereby forming a porous layer 42. The coating amount of the porous layer forming paint was adjusted so as to be about 0.7 mg/cm$^2$ (in terms of the solid content). As the drying conditions, the atmosphere temperature in a hot air drying furnace was set at 80° C., and the air velocity was set at 16.2 m/s. Incidentally, in the present example, as shown in Table 1, as separator sheets, there were used two kinds of a monolayered structure of polyethylene (PE) and a three-layered structure of polypropylene/polyethylene/polypropylene (PP/PE/PP). All the separator sheets were each configured to have a thickness of 20 μm, and a porosity of 47%.

Each porosity of the resulting various porous layers were calculated. The porosity (%) of the porous layer was calculated from $(1-W/\rho V) \times 100$. Herein, W is the mass of the porous layer, and was measured by an electronic balance. V is the apparent volume of the porous layer, and was calculated from the outer dimensions (thickness×area) of the porous layer by SEM observation, ρ is the true density (theoretical density) of the material forming the porous layer. The results are shown in Table 1.

As apparent from the results of Table 1, each porous layer of Examples 1 to 8 in which the median value in the circularity distribution was set at 0.85 to 0.97 had a porosity of 51 to 70%, and thus was found to be preferable as the porous layer. Particularly, by setting the median value in the circularity distribution at 0.85 to 0.91, it was possible to implement a porous layer which had achieved both of the electrolyte permeability of 60 to 70% and the mechanical strength at a high level. From the results, the median value in the circularity distribution is desirably set at 0.85 to 0.91 from the viewpoint of improving the electrolyte permeability and the mechanical strength of the porous layer.

<Measurement of Membrane Resistance>

Figure 5:
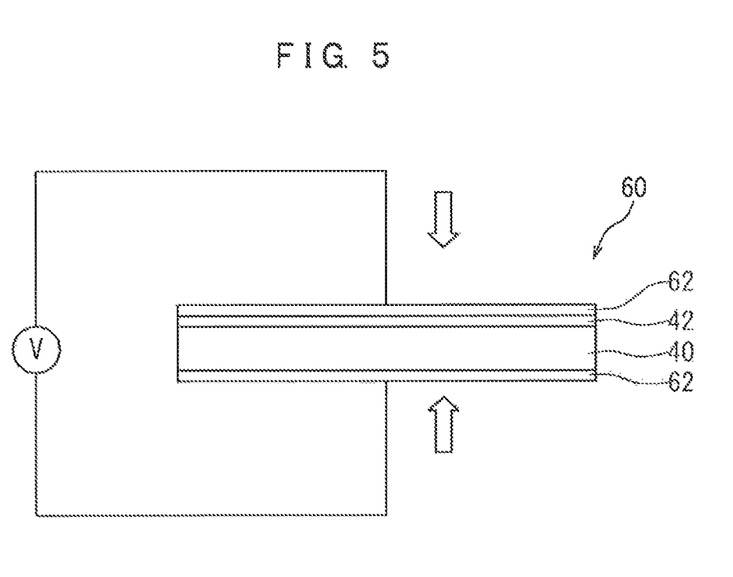
FIG. 5 is a view for illustrating a measuring method of a membrane resistance in accordance with one test example.

Using each of the separator sheets with the various manufactured porous layers, a measuring cell was constructed, and was evaluated for the membrane resistance (Rs). Specifically, as schematically shown in FIG. 5, the porous layer 42 and the separator 40 were impregnated with a non-aqueous electrolyte, and were sandwiched between two copper plates 62 with an area of 35 mm$^2$ and a thickness of 1 mm. As the non-aqueous electrolyte, there was used the one in which LiPF$_6$ as a supporting salt was contained in a concentration of about 1 mol/liter in a mixed solvent containing ethylene carbonate (EC), dimethyl carbonate (DMC), and ethyl methyl carbonate (EMC) in a volume ratio of 3:4:3, Such cells 60 were manufactured so as to include one, two, and three separator sheets, respectively. Then, each cell was placed in a 25° C. thermostat, and was measured for the resistance value (Rs) of the cell by the alternating impedance method while being applied with a torque pressure of 50 cN·m from above and below the two copper plates 62. The measuring conditions of the alternative impedance were set as follows: the alternating applied voltage 5 mV, and the frequency range 10000 Hz to 1 Hz. The resistance values of respective resulting cells are plotted with respect to the number of separators, and are linearly approximated to determine the membrane resistance per one separator. The results are shown in Table 1.

As apparent from the results of Table 1, the cells of Examples 1 to 8 each having a median value in the circularity distribution of 0.85 to 0.97 were largely reduced in membrane resistance as compared with the cells of Comparative Examples 3 and 4. Particularly, by setting the median value in the circularity distribution at 0.91 or less, it was possible to implement a membrane resistance as very low as 1.5 Ω·cm² or less. Further, the cells of Examples 1 to 7 each having a lower value in the circularity distribution of 0.7 to 0.9 were further reduced in membrane resistance as compared with the cell of Example 8.

<Battery Characteristic Evaluation>

Using each of the separator sheets with the various manufactured porous layers, a lithium secondary battery was constructed, and was evaluated for the battery characteristics. The lithium secondary batteries were manufactured in the following manner.

<Positive Electrode Sheet>

A $Li_{1.15}Ni_{0.33}Mn_{0.33}Co_{0.33}O_2$ powder as a positive electrode material, acetylene black (AB) as a conductive material, and polyvinylidene fluoride (PVdF) as a binder were mixed in N-methylpyrrolidone (NMP) so that the mass ratio of the materials was 88:10:2, thereby preparing a positive electrode active material layer paste. The positive electrode active material layer paste was coated in a band form on both sides of long-length sheet-shaped aluminum foil (positive electrode collector 12). As a result, there was manufactured a positive electrode sheet 10 in which positive electrode active material layers 14 were provided on both sides of the positive electrode collector 12. The coating amount of the positive electrode active material layer paste was adjusted so as to be about 17.2 mg/cm² (in terms of the solid content) in a total amount for both sides.

<Negative Electrode Sheet>

A graphite powder as a negative electrode active material, styrene butadiene rubber (SBR) as a binder, and carboxyl methyl cellulose (CMC) as a thickener were dispersed in water so that the mass ratio of the materials was 98.6:0.7:0.7, thereby preparing a negative electrode active material layer paste. The negative electrode active material layer paste was coated on both sides of long-length sheet-shaped copper foil (negative electrode collector 22). As a result, there was manufactured a negative electrode sheet 20 in which negative electrode active material layers 24 were provided on both sides of the negative electrode collector 22. The coating amount of the negative electrode active material layer paste was adjusted so as to be about 11.1 mg/cm² (in terms of the solid content) in a total amount for both sides.

<Lithium Secondary Battery>

The positive electrode sheet 10 and the negative electrode sheet 20 were wound via two separator sheets 40 each with a porous layer, thereby manufacturing the wound electrode body 80. At this step, for the one including the separator sheets of PE, the arrangement was made so that the porous layer and the positive electrode sheet faced each other. Whereas, for the one including the separator sheets of PP/PE/PP, the arrangement was made so that the porous layer and the negative electrode sheet faced each other. The wound electrode body 80 obtained in this manner was accommodated together with a non-aqueous electrolyte in the battery container 50 (18650 model cylinder type), and the opening of the battery container 50 was air-tightly sealed. As the non-aqueous electrolyte, there was used a non-aqueous electrolyte in which $LiPF_6$ as a supporting salt was contained in a concentration of about 1 mol/liter in a mixed solvent including ethylene carbonate (EC), ethyl methyl carbonate (EMC), and dimethyl carbonate (DMC) in a volume ratio of 3:4:3. In this manner, the lithium secondary battery 100 was assembled.

<High Rate Durability Test>

Each of the resulting lithium secondary batteries was applied with a charging/discharging pattern repeating 20-C 10-sec CC discharging, to perform a charging/discharging cycle test. Specifically, under room temperature (about 25° C.) environment, 20-C 10-sec CC discharging is performed, and after a 5-sec pause, 5-C 40-sec CC charging is performed. This charging/discharging cycle was continuously repeated 1000 times. Then, the resistance increase rate was calculated from the IV resistance at before the charging/discharging cycle test (the initial resistance of the lithium secondary battery), and the IV resistance at after the charging/discharging cycle test. Herein, the IV resistances at before and after the charging/discharging cycle were calculated from the voltage drop after 10 seconds from discharging upon performing pulse discharging at 25° C. and at 30 C, respectively. Incidentally, the resistance increase rate (%) was determined by [(IV resistance at after charging/discharging cycle test–IV resistance at before charging/discharging cycle test)/IV resistance at before charging/discharging cycle test]×100. The results are shown in Table 1.

<Foreign Matter Internal Short Circuit Test>

Further, a lithium secondary battery was constructed with the same method as the procedure described above, and a foreign matter internal short circuit test was carried out. The foreign matter internal short circuit test was performed using an L-shaped nickel strip 0.2 mm in height×0.1 mm in width, and 1 mm per side according to JIS C8714, thereby to examine the presence or absence of an NG product resulting in smoking. The results are shown in Table 1. In Table 1, "Good" represents a battery in which smoking was not observed, and "No Good" represents a battery in which smoking was observed.

As shown in Table 1, the batteries of Comparative Examples 1 to 4 each having a median value in the circularity distribution of less than 0.85 or more than 0.97 were remarkably increased in resistance increase rate at after the high rate charging/discharging cycle test. Whereas, in the batteries of Comparative Examples 1 and 2, smoking was observed in the foreign matter internal short circuit test. In contrast, for the batteries of Examples 1 to 8 each having a median value in the circularity distribution of 0.85 to 0.97, the resistance increase rate at after the cycle test was as good as 13% or less. Further, smoking was also not observed in the foreign matter internal short circuit test. Thus, it was possible to confirm that these were batteries excellent in safety. Namely, by setting the median value of the circularity distribution at 0.85 to 0.97, it was possible to obtain a battery satisfying both of high rate charging/discharging cycle durability and safety at a high level. From the results, the median value in the circularity distribution is desirably set at 0.85 to 0.97 from the viewpoint of the high rate charging/discharging cycle durability and safety. Further, in the case of the tested batteries, by setting each lower value of the circularity distribution at 0.7 to 0.9, the resistance increase rate was further improved to 12% or less (Examples 1 to 7). Particularly, by setting each median value of the circularity distribution at 0.85 to 0.93, it was possible to achieve a resistance increase rate as very low as 8% or less (Examples 1 to 4).

From the results up to this point, with the test, by setting the median value in the circularity distribution at 0.85 to 0.97, it was possible to achieve a lithium secondary battery small in resistance increase rate at after the high rate charging/discharging cycle, and excellent in safety. For this reason, with the present configuration, it is possible to provide a high performance lithium secondary battery excellent in high rate charging/discharging cycle durability and safety.

Up to this point, the present invention was described by way of preferable embodiments. However, such a description is not an exclusive matter, and of course, various modifications are possible.

For example, in the embodiments and the test examples, there were shown the cases where each porous layer 42 was formed on the surface of the separator sheet 40 opposite to the negative electrode sheet 20. However, these cases are not exclusive, and the porous layer 42 may be formed on the surface of the separator sheet opposite to the positive electrode sheet (or, on both sides of the separator sheet). Alternatively, not limited to the surface of the separator sheet, the porous layer 42 may be formed on the surface of the positive electrode sheet or the negative electrode sheet.

Further, so long as there is adopted a porous layer having filler particles satisfying the preferable median value in the circularity distribution herein disclosed, there is no particular restriction on the shape (outer shape or size) of the lithium secondary battery to be constructed. The battery may be of a thin sheet type in which the outer package is formed of a laminate, film or the like, or may be a battery with a battery outer package case in a cylindrical shape or a rectangular parallelepiped shape. Alternatively, a compact button shape is also acceptable.

Figure 6:
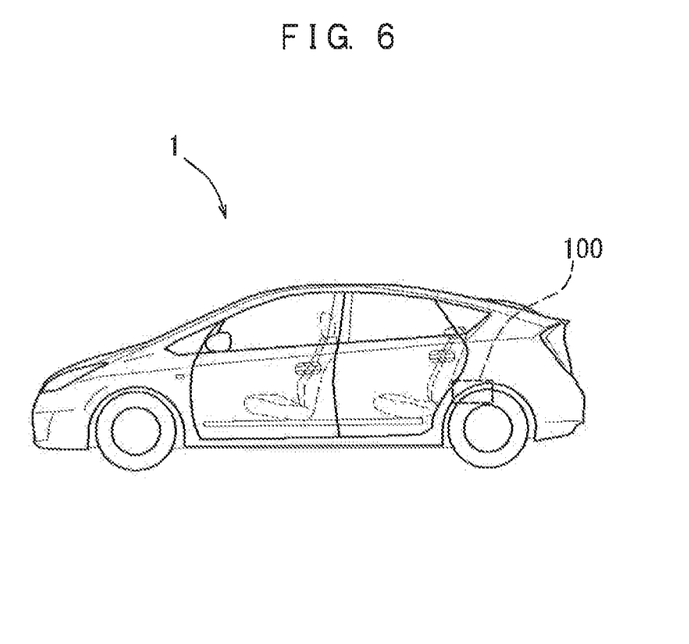
FIG. 6 is a side view schematically showing a vehicle including the non-aqueous electrolyte secondary battery in accordance with one embodiment of the present invention.

Incidentally, any lithium secondary battery 100 herein disclosed can have performances (e.g., capability of providing a high output) suitable as a battery to be mounted on a vehicle, and particularly, can be excellent in durability against high rate charging/discharging. Therefore, in accordance with the present invention, as shown in FIG. 6, there is provided a vehicle 1 having any lithium secondary battery 100 herein disclosed. Particularly, there is provided a vehicle 1 (e.g., a car) having the lithium secondary battery 100 as a power source (typically, the power source of a hybrid vehicle or an electric vehicle).

Further, as the preferable objects to which the technology herein disclosed is applied, there are exemplified lithium secondary batteries assumed to be usable for a charging/discharging cycle including 50-A or more (e.g., 50-A to 250-A), and further 100-A or more (e.g., 100-A to 200-A) high rate discharging; lithium secondary batteries of a large capacity type with a theoretical capacity of 1 Ah or more (further 3 Ah or more), and assumed to be usable for a charging/discharging cycle including 10-C or more (e.g., 10-C to 50-C), and further 20-C or more (e.g., 20-C to 40-C) high rate charging/discharging; and the like.

INDUSTRIAL APPLICABILITY

With the configuration of the present invention, it is possible to provide a high performance non-aqueous electrolyte secondary battery excellent in high rate durability.

The invention claimed is:

1. A non-aqueous electrolyte secondary battery, comprising:
    an electrode body having a positive electrode sheet and a negative electrode sheet stacked via a separator sheet,
    a porous layer having filler particles and a binder between the separator sheet and at least one of the positive electrode sheet and the negative electrode sheet, and
    a median value in a circularity distribution of the filler particles contained in the porous layer being 0.85 to 0.97, wherein
    the porous layer is formed by the following steps:
    preparing a metal compound powder as filler particles;
    subjecting the metal compound powder to a grinding treatment or a spheroidization treatment so that the median value in the circularity distribution of the prepared metal compound powder becomes 0.85 to 0.97;
    after the grinding treatment or the spheroidization treatment, preparing a porous layer forming paint in which the metal compound powder and the binder are dispersed in a solvent, and applying this on at least any one surface of the positive electrode sheet, the negative electrode sheet, and the separator sheet, and drying the paint.

2. The non-aqueous electrolyte secondary battery according to claim 1,
    wherein a value of a circularity corresponding to cumulative 10% from a smaller circularity in the circularity distribution of the filler particles is 0.7 to 0.9.

3. The non-aqueous electrolyte secondary battery according to claim 1,
    wherein the filler particle is alumina or alumina hydrate.

4. The non-aqueous electrolyte secondary battery according to claim 1,
    wherein the porous layer is formed on at least a surface of the separator sheet.

5. The non-aqueous electrolyte secondary battery according to claim 4,
    wherein the porous layer is formed on a surface of the separator sheet opposite to the negative electrode sheet.

6. The non-aqueous electrolyte secondary battery according to claim 1, wherein the electrode body is a wound electrode body having the positive electrode sheet and the negative electrode sheet that are wound via the separator sheet.

* * * * *